June 27, 1944. L. L. YOUNG 2,352,302
PRESSURE MEASURING DEVICE
Filed April 22, 1942

INVENTOR
LLOYD L. YOUNG
BY
ATTORNEY

Patented June 27, 1944

2,352,302

UNITED STATES PATENT OFFICE 2,352,302

PRESSURE MEASURING DEVICE

Lloyd L. Young, Patchogue, N. Y., assignor to Radio Corporation of America, a corporation of Delaware Application April 22, 1942, Serial No. 439,981

6 Claims. (Cl. 73—31)

This invention relates to a new and useful pressure measuring device.

An object of this invention is to simplify and improve pressure measuring devices generally.

Another object of this invention is to provide a very sensitive pressure measuring device which is particularly adapted to measuring draft pressures in smoke stacks and chimneys.

This invention is a further improvement over my copending application, Serial No. 381,033, filed February 28, 1941.

A feature of this invention is the novel arrangement of a transparent chamber containing a liquid, having located therein a floating member which is provided with a scale and a reentrant tube.

This invention will best be understood by referring to the accompanying drawing, in which Fig. 1 is a sectional view of the general arrangement of the pressure measuring device.

Figure 2:
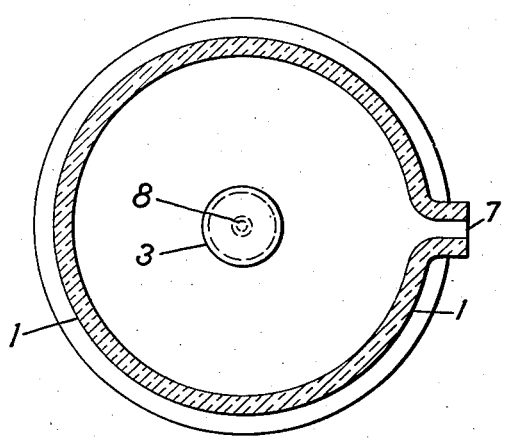
Fig. 2 is a cross-sectional view along the line 2—2 of Fig. 1.
Figure 1:
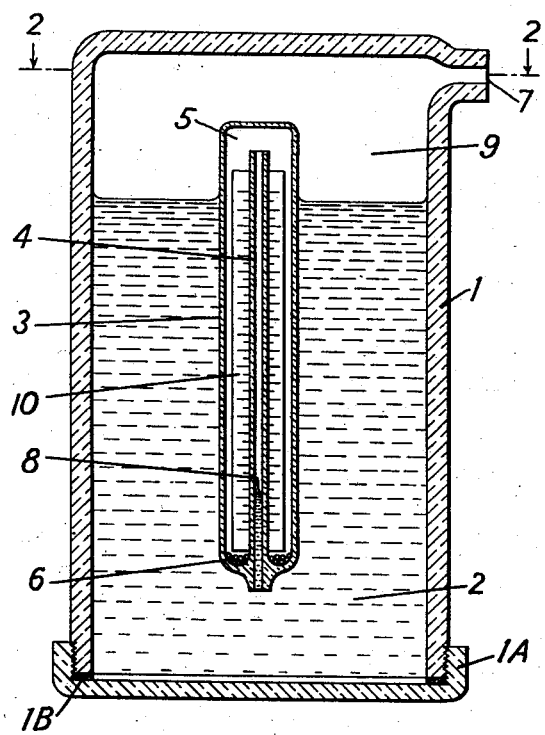

Referring now in detail to Figs. 1 and 2 of the drawing, a transparent or glass container 1, having a removable cover 1A, which is threaded on and clamped to be fluid-tight by means of a gasket 1B, contains a suitable transparent fluid 2, such as water, oil or alcohol. Container 1 has located in the upper portion thereof an inlet tube 7, through which pressure may be applied in a space above the level of the liquid 2. A hollow tubular transparent float member 3 is arranged to float within liquid 2. The hollow tubular glass floating member 3 has a transparent glass reentrant tube 4 sealed securely to the lower portion and open at the upper end thereof. The open upper end is shorter than float 3 but is long enough to reach above the normal level of the liquid 2 and is in fluid communication with the interior portion of the float. A suitable graduated scale 10 is located within member 3. Ballast weights 6 are arranged to keep the hollow tubular member in an upright floating position. In an experimental device which was made up, the reentrant tube 4 had an inside diameter of .25 centimeter, although a smaller bore tube would give a greater level 8 change for the same pressure applied at inlet tube 7. This gave substantially ⅜ of an inch change for a change of pressure of 1 inch of water which is .578 oz. per square inch. In terms of altitude, there would be a change of .54 inch if the device were taken from sea level to a point 100 ft. above sea level.

In the operation of this device, when positive pressure is applied at inlet tube 7 to air space 9 in the upper part of container 1, the air, or other gas, 5 within chamber 3, is compressed and the top of the fluid level 8 moves upward. The change in level 8, as read through the transparent casing and liquid on the scale 10, is the result of the applied pressure. Although the member 3 floats lower in the liquid 2 under the influence of the applied pressure, the movement of level 8 moves a greater distance in direct ratio of the diameters of the member 3 and the reentrant tube 4.

This device, having entrapped gas, will be sensitive to temperature changes, and should therefore be used in conjunction with a temperature compensation curve if pressure changes over a long period of time are desired. For spot readings, however, temperature changes will not be an important factor.

Figure 3:
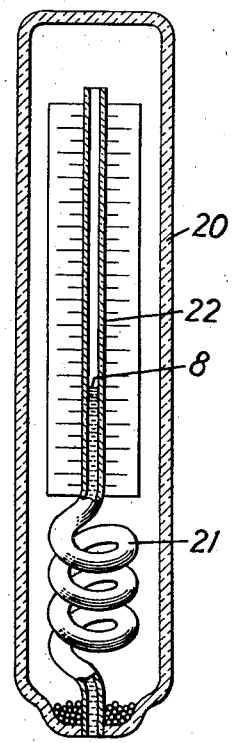
Fig. 3 is a sectional view of a modified float.

In the modification shown by Fig. 3, there is shown a floating member which comprises a transparent glass chamber 20 having located at the lower portion thereof a helically formed reentrant tube 21, which has located at the upper portion thereof a scale 22, which is calibrated in any suitable manner.

Although only a few forms of this invention are disclosed, it is to be understood that the invention should not be limited precisely thereto.

What is claimed is:

1. A pressure measuring indicator comprising a transparent chamber partly filled with a transparent fluid and having means to communicate with outside pressure, a transparent float member adapted to float within said fluid, a transparent tube secured to the lower portion of said transparent member and extending upward within said float member and in communication with the interior of said float, said tube being open at its lower end to be in fluid communication with said fluid, a scale secured to said tube and weight means within the floating member to ballast the same, whereby the top level of said fluid within said tube moves along said scale to indicate thereon the pressure applied to the communication means of said chamber.

2. A pressure measuring indicator comprising a transparent chamber partly filled with a transparent liquid and having means to communicate with outside pressure, a transparent member adapted to float within said liquid, a transparent tube secured to the lower portion of said transparent member and extending upward within said float member and in communication with the interior of said float, said tube being open at its lower end to be in liquid communication with said liquid, a scale secured to said tube and weight means within the floating member to ballast the same, whereby the top level of said liquid within said tube moves along said scale to indicate thereon the pressure applied to the communication means of said chamber.

3. A pressure indicator comprising a transparent glass container filled with a transparent fluid, an inlet located at the upper portion of said container forming means to communicate with the outside pressure, a transparent member adapted to float in said fluid, a transparent tube secured to the lower portion of said floating member and extending upward within said float member and in communication with the interior of said float, said tube being open at its lower end to be in fluid communication with said fluid, a scale secured to said tube and weight means within the floating member to ballast the same, whereby the top level of said fluid within said tube moves along said scale to indicate the pressure applied to the communication means of said chamber.

4. A pressure measuring indicator comprising a transparent chamber partly filled with a transparent fluid and having means to communicate with outside pressure, a transparent member adapted to float within said fluid, a transparent reentrant tube having its lower portion helical in form and its upper portion straight, the lower portion of said reentrant tube secured to the lower portion of said member and extending upward within said float member and in communication with the interior of said float, said tube being open at its lower end to be in fluid communication with said fluid, a scale secured to the straight portion of said reentrant tube and weight means within the floating member to ballast the same, whereby the top level of said fluid within said reentrant tube moves along said scale to indicate thereon the pressure applied to the communication means of said chamber.

5. A pressure indicator comprising a heavy walled transparent container partly filled with transparent oil, a transparent member adapted to float in said oil, a transparent tube secured to the lower portion of said floating member and extending upward within said float member and in communication with the interior of said float, said tube being open at its lower end to be in fluid communication with said oil, a scale secured to said tube and weight means within the floating member to ballast the same, whereby the top level of said oil within said tube moves along said scale to indicate thereon the pressure applied to the communication means of said chamber.

6. A pressure measuring indicator comprising a transparent chamber partly filled with a transparent fluid, a removable cap located at the lower end of said chamber, said chamber having means to communicate with outside pressure, a transparent member adapted to float within said fluid, a transparent tube secured to the lower portion of said member and extending upward within said float member and in communication with the interior of said float, said tube being open at its lower end to be in fluid communication with said fluid, a scale secured to said tube and weight means within the floating member to ballast the same, whereby the top level of said fluid within said tube moves along said scale to indicate thereon the pressure applied to the communication means of said chamber.

LLOYD L. YOUNG.